United States Patent [19]
Horwath

[11] 3,715,714
[45] Feb. 6, 1973

[54] POROUS PIPE ACOUSTIC SENSOR
[75] Inventor: Tibor G. Horwath, Alexandria, Va.
[73] Assignee: The United States of America as represented by the Secretary of the Army
[22] Filed: Oct. 23, 1970
[21] Appl. No.: 83,560

[52] U.S. Cl.............340/15, 181/0.5 R, 181/0.5 VM, 340/16 R
[51] Int. Cl..............................................H04b 11/00
[58] Field of Search......181/0.5 R, 0.5 VM; 340/8 R, 340/16 R, 15, 3 T, 7 R

[56] References Cited
UNITED STATES PATENTS 3,485,318   12/1969   Eichler ...............................181/0.5 R

*Primary Examiner*—Richard A. Farley
*Attorney*—Harry M. Saragovitz, Edward J. Kelly, Herbert Berl and Glen Ovrevik

[57] ABSTRACT

This invention is a dynamic pressure sensor of the porous pipe variety for use in sensing the presence of an acoustic energy source in a moving fluid environment. The sensor is especially adaptable to moving vehicle applications wherein the sensor is located on the moving vehicle and boundary layer interference due to movement of the vehicle and the sensor in air are prime considerations.

5 Claims, 2 Drawing Figures

FIG. I

POROUS PIPE ACOUSTIC SENSOR

The invention described herein may be manufactured and used by or for The Government of the United States of America for governmental purposes without the payment to me of any royalties thereon.

BACKGROUND OF THE INVENTION

A wide variety of detectors have been employed in homing systems for seeking and acquisition of a moving target. In general, these homing systems employ detectors sensitive to one or more of the various types of signatures emitted by the moving target. It is well known, for example, that temperature sensitive sensors have been employed to track the path of submarines operating under water long after their departure from the area. Likewise, infrared detectors have been employed as homing means to guide missiles to the exhaust of jet aircraft in flight.

It will be appreciated that all powered moving targets emit an acoustic signature due to motion of the target as well as power plant noise. Heretofore, acoustic signature sensing systems have been largely restricted to fixed position detectors in quiet locations. It will be appreciated that homing systems necessitate installation of the sensing means on a moving vehicle and this in turn introduces boundary layer interference noise due to movement of the vehicle and the sensor in air. Such interference noise must be minimized, of course, if acoustic signature detectors are to be utilized effectively. Generally, flow noise reduction techniques, applicable to acoustic detectors, substantially reduce the signal to noise ratio of the detector. No prior art acoustic detector which affords the essential noise reduction and is sufficiently sensitive for use in sophisticated acoustic homing system is presently known.

SUMMARY OF THE INVENTION

Acoustic sensors located on a moving vehicle receive the sound radiated by a target and in the homing system application the target input signal information received is processed to guide the vehicle toward the target. The motion of the sensor relative to air creates, on the surface of the sensor, a boundary layer of potentially unstable flow which causes pressure fluctuations to produce a second input signal. Likewise, the surfaces of the vehicle moving in air experience boundary layer pressure fluctuations which radiate toward the acoustic sensor to produce a third input signal.

It will be appreciated that the basic objective in the design of an acoustic sensor is to enhance the signal to noise ratio of dynamic pressures, that is, to minimize the interference effect of the second and third input signals on the target signal.

The sensor of the present invention embodies a relatively large sensitive surface area which enables a direct summation of local boundary layer pressures and thus affords a more restricted acceptance region in spectral space as compared to that obtained with a group of small sensors, each effectively measuring the local pressure at a set of points, with electronic means for consideration of the electrical outputs of the individual sensors.

The large sensitive area of the sensor of the present invention consists of a porous cylindrical surface. The sensor, which may be termed a porous pipe sensor, is designed to receive the three principal input signals through its porous wall. A uniform frequency response is achieved when acoustic waves inside the porous pipe propagating toward the front of the pipe are absorbed. Optimum performance, maximum sensitivity and signal to noise ratio is obtained when the reflection coefficient of the waves propagating toward the microphone end of the pipe is unity independent of frequency.

The uniform frequency response and the maximum sensitivity of the sensor are achieved by the introduction of an internally disposed reflective surface of selected configuration.

The disclosed novel sensor structure effectively eliminates the noise interference of the second and third input signals on the target signal. In addition, this structural configuration provides an acoustic sensor wherein magnitude of the sensed signal is indicative of the angle of incidence of the signal.

These features and other significant objects of the invention will become apparant from a clear understanding of the invention for which reference is had to the description of a preferred embodiment of the invention and the drawings wherein:

FIG. 1 is cross section view of the porous pipe sensor of this invention showing the internal structure thereof in a preferred embodiment, together with its associated microphone.

FIG. 2 pictorally depicts an array of porous pipe sensors in a typical orientation with a typical signal processor connected to the sensors for obtaining guidance information.

DESCRIPTION OF THE PREFERRED EMBODIMENTS

Figure 1:
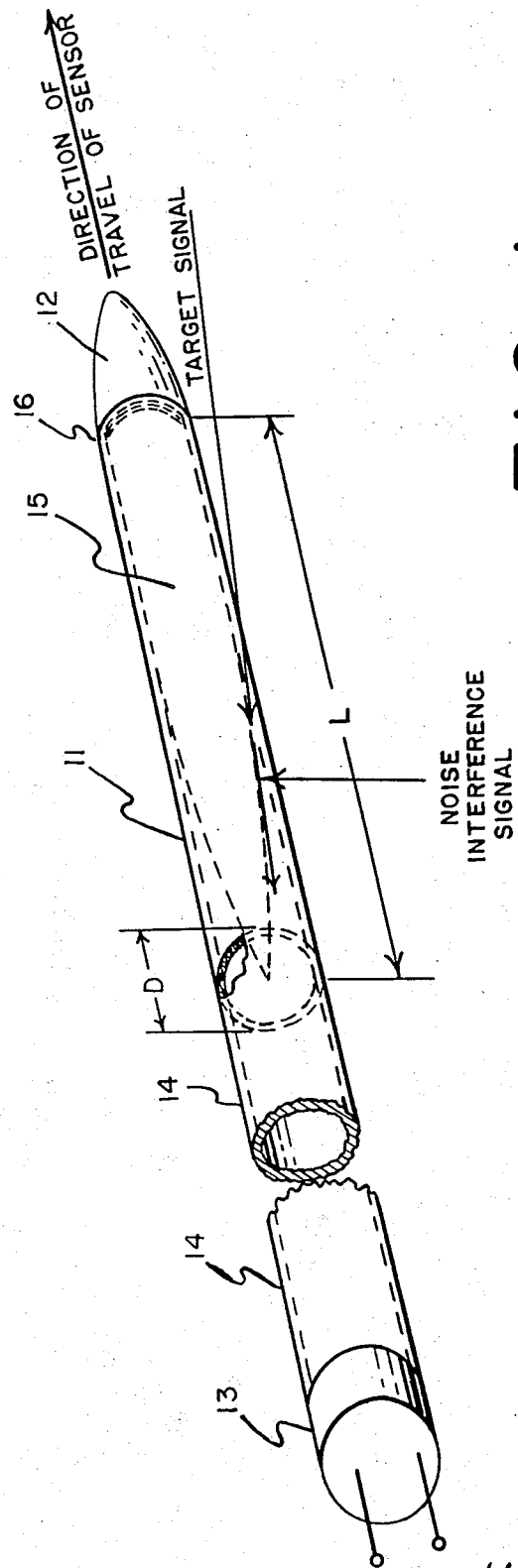

The sensor shown for illustrative purposes in FIG. 1 comprises a thin side wall tubular member 11 of selected length L and diameter D with a nose cone 12 attached to one end for aerodynamic purposes to minimize pressure fluctuation along the surface of the tubular member as the sensor moves through the air. A microphone 13 is connected to the opposite end of the tubular member 11 by means of an acoustical conduit 14. For reasons which will be discussed in more detail hereinafter, a wave energy reflective surface 15 of generally conical configuration is disposed within the tubular member 11 and extends substantially the entire length of the tubular member 11. As indicated at 16, the tubular member 11 is threaded at the nose cone end thereof for simplified nose cone and reflective surface assembly purposes.

In accordance with the preferred embodiment of the invention, the thin wall of the tubular member 11 is made of sintered stainless steel particles of selected size and the wall is identified by its manufacturer, Mott Metallurgical Corporation, Farmington, Connecticut, 06032, in accordance with micron size of the sintered stainless steel particles. This particular thin wall product is more commonly used in air filtration applications and has been found to have a substantially uniform porosity as measured by its flow resistance characteristic.

$$F_x = p/u$$

where
$p$ = pressure drop across the sample (Newtons/m$^2$)
$u$ = volume velocity of airflow across the sample ($m^3$/sec)

$F_x$ = flow resistance (MKS acoustic ohms)

For purposes of this invention, flow resistance $F_x$ is measured at low values of pressure drops $\Delta p$ across the porous wall, i.e., in the region $\Delta p \approx 0.1$ inch − 1.0 inch water.

It has been found that for acoustic waves at low intensities, the flow resistance $F_x$ is constant independent of amplitude. In a typical sensor, the porous tubular member 11 could be one-sixteenth inch in thickness, 12 inches in length, one-half inch in diameter, and made of 2 micron material having a flow resistance of approximately 105 pc, measured at low values of pressure differential across the porous wall where $p$ is the density of the fluid medium and $c$ is the velocity of sound in the fluid medium. Where air is the fluid medium:

$p$ = (density of the fluid medium) 1,293 kgm$^{-3}$
$c$ = (*velocity of sound in the fluid medium*) 3,34.10$^2$ m sec$^{-1}$ The sintered stainless steel particles material disclosed as the sensitive side wall surface herein may be physically described as a relatively thin material made of metallic particles of micron size and having a multitude of randomly distributed and substantially closely spaced, finite, nondescript channels which determine the flow resistance characteristic of the material in selected fluid mediums.

While the porous pipe tubular member 11 is shown as cylindrical in the illustrated embodiment with a wall of uniform thickness, it will be appreciated that other elongated configurations of oval, triangular, or rectangular cross section, for example, may be utilized in selected applications with the outer configuration dependent primarily upon aerodynamic considerations and the inner configuration largely dependent upon standing wave considerations.

Furthermore, it will be appreciated that it is within the purview of this disclosure to substitute other porous wall materials having a suitable flow resistance characteristic and to adapt same, if necessary, to support wave energy within the tubular body 11. However, it should be understood that nonporous wall surfaces which have been perforated to provide a selected flow resistance are not interchangeable with porous wall surfaces in this invention. In particular, it has been found that for a given size sensor, the maximum flow impedance obtainable, which would be otherwise suitable for use, is several orders of magnitude too low for use in this invention. Moreover, perforations afford an irregular surface which creates undesireable turbulence at the sensitive surface and have been found to generate a side lobe interference factor, which dependent upon size of the perforations and spacing therebetween, may create a noise source of considerable consequence.

As shown in FIG. 1, the microphone 13 may be connected to the porous pipe tubular member 11 by a nonporous, loss free acoustical conduit 14 having a cross section configuration substantially the same as the porous pipe tubular member 11. Both condenser microphones (Bruel & Kjaer, type 4133) and piezoelectric microphones Lafayette No. 99–4509) have been found suitable for use in this invention. Indeed, the selection of the type of microphone is not critical and many different varieties may be employed. In particular, it has been found that the type of microphone selected has little, if any effect, on the directivity characteristic of the sensor, which is, of course, of particular concern in homing system applications.

It will be appreciated that it is within the purview of this disclosure to incorporate various propagation mode transition devices, not shown, in lieu of the wave energy transmission means shown in the drawing 14 if the selection of a particular type of microphone necessitates a propagation mode transition.

In consideration of the configuration of the preferred embodiment, it will be recognized that the degree of flow noise rejection reflected in the signal to noise ratio of an acoustic signal received by the porous pipe sensor depends to a large extent on the standing wave ratio inside the porous pipe member 11 due to the reflection coefficient of the front end termination. The signal to noise ratio is optimum if the front end of the member 11 is appropriately terminated to be nonreflective.

An effectively nonreflective termination is achieved in this invention by internal disposition of the reflective surface 15 which extends from one end of the elongated member 11 to the other.

It has been found that in the relatively low frequency application of the sensor of this invention the flow impedance characteristic $F_x$ of the porous material and the internal dimensions (length L and diameter D) should be in the following relation:

$$F_x = \frac{4L}{D}(\rho c)$$

where
$\rho$ = is the density of the fluid medium
$c$ = is the velocity of sound in the medium Likewise, it has been found that in the uniform porosity, cylindrical tube configuration shown in FIG. 1, the shape of the internal cone should afford a taper from the axis, beginning at the microphone end of the elongated member 11 and expanding outward. It has been determined that a parabolic curvature of the taper, as shown in the drawing, affords the best results in the case of a uniformly reflective surface. However, it will be recognized that the configuration of the reflective surface 15 may vary in accordance with other structural variations. For example, in the event the flow resistance of the porous pipe member 11 was graduated along its length with greater flow resistance at the front end, the conical configuration of the reflective surface might be broadened in the region of its base.

Figure 2:
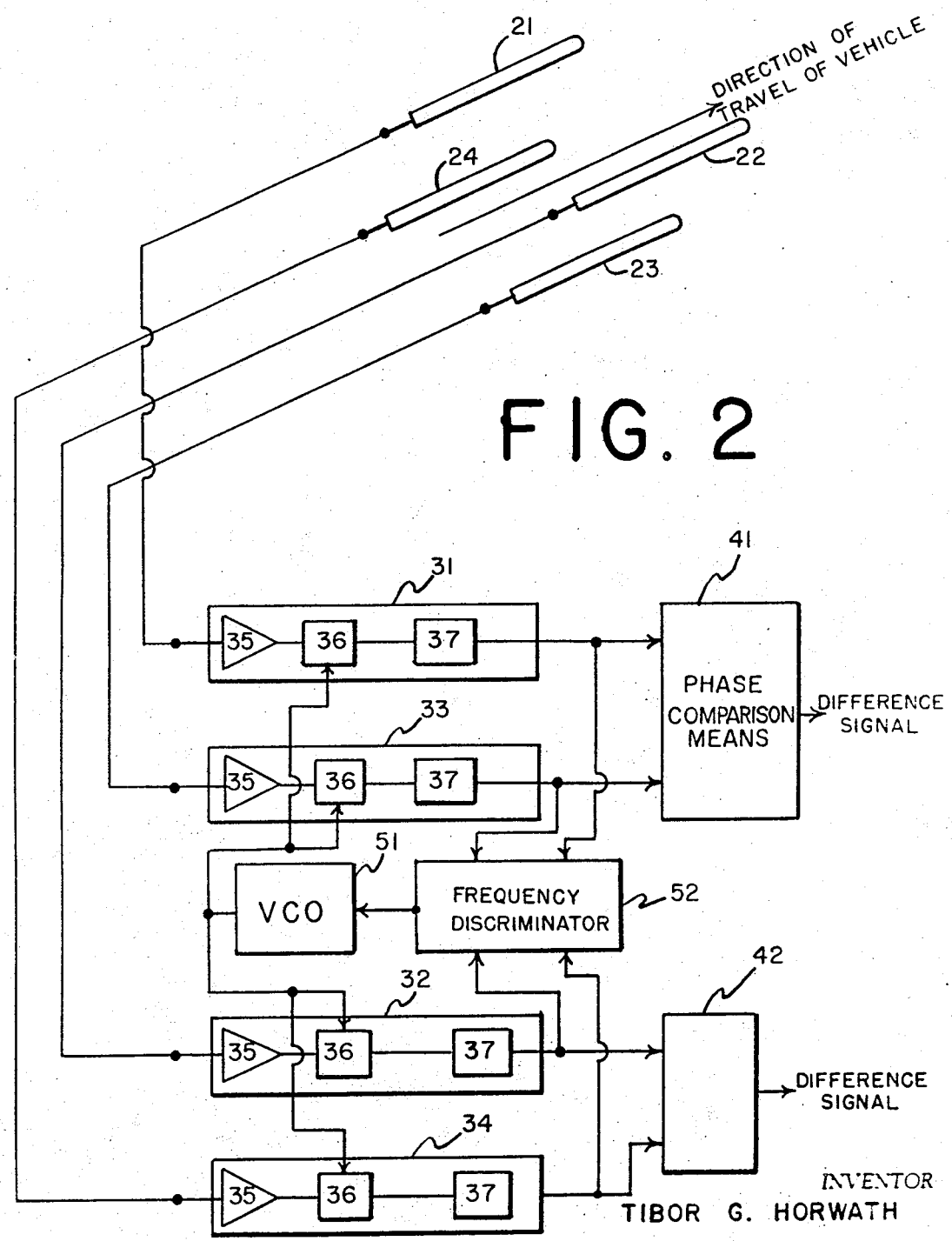

FIG. 2 shows an array of four porous pipe sensors 21, 22, 23 and 24 in a typical homing system orientation adapted for mounting on a vehicle, not shown, and moveable in the three coordinates x, y and z.

The sensors 21, 22, 23 and 24 are electrically connected to respective narrow band pass channels 31, 32, 33 and 34, each comprising a cascade connection of preamplifier modulator, and band pass filter as shown. The channels 31 and 33 are connected to a phase measuring circuit 41 to provide a first phase differential signal and the channels 32 and 34 are connected to a phase measurement circuit 42 to provide a second phase differential signal.

Tracking a narrow band filtering of a selected harmonic tone of the target signal is achieved by heterodyne technique. A variable frequency oscillator 51, which may be voltage controlled oscillator, is connected to the modulator in each of the channels 31, 32, 33 and 34 to modulate the sensor output.

In a typical case, a symmetrical voltage controlled oscillator, one which suppresses the carrier frequency of the oscillator, $f_c$, at its output, is employed as the modulator. Identical fixed bandwidth band pass filters are employed in each of the channels 31, 32, 33 and 34 and each band pass filter is tuned about a center frequency $f_o$ to capture a part of the upper sideband of the modulated signal entering the band pass filter. Thus, a change in frequency, $f_c$, of the modulator effectively enables a scanning of the frequency spectrum of the sensor signal within bandwidth limits of the band pass filters.

In the homing system application, the tracking function is achieved by the addition of a frequency discriminator 52 responsive to the outputs of each of the channels 31, 32, 33 and 34. The output of the frequency discriminator 52 controls the frequency, $f_c$, of the modulator 51. Thus, if a significant portion of the modulated signal falls outside the pass band of the filters, the output of the channels is reduced in magnitude and the frequency discriminator responds in a conventional feedback manner to shift the modulator frequency, $f_c$, such that the modulated target signal falls within the pass band of the filters.

The phase measuring circuits 41 and 42 each function in a relatively conventional manner, first clipping each input signal, then obtaining pulses from the axis crossings of the clipped wave train and thereafter generating a rectangular wave train whose ON duration is proportional to the time difference between axis crossings of the two input signals. Thus, the mean valve output of each phase measuring circuit is a linear function of the phase delay between pairs of sensors.

While the electronic circuitry of the various elements of the channels 31, 32, 33 and 34 as well as associated modulator, frequency discriminator, and phase measuring means may be conventional, it has been found that phase matching throughout is vital to operation of the system. That is, the phases of each pair of sensors and associated channels must be well matched throughout.

In practice, this phase matched requirement means that in the normal frequency range of the acoustic sensor, 300 – 1,000 cycle/sec, (1) the porous pipes 11 should have nearly identical physical dimensions and porosity characteristics, as well, including internal reflective structure (2) the microphones in each pair of channels should be phase matched with respect each other and their respective porous pipe sections (3) the preamplifiers should be phased matched and (4) the narrow band filters in each channel should be phase matched.

Other elements of the electronic circuitry, such as the amplitude clippers and the modulator 51 usually have a rather wide bandwidth and consequently do not present a phase matching problem.

It will be seen that the dynamic performance of the homing system illustrated in FIG. 2 is controlled primarily by the response characteristic of the band pass filters in each of the channels 31, 32, 33 and 34. Accordingly, it has been found desireable to make the response of the feedback loop within the helerodyne oscillator circuitry faster than the response of the filters. This provides a steady state gain with gain dependent upon the signal to noise ratio (SNR) of the sensor output.

In determining the signal to noise ratio, the flow noise signal derived from movement of the sensor vehicle, is considered as the main source of noise, at each sensor and the noise is assumed to have the same magnitude, frequency spectrum and bandwidth at each sensor. For a target signal of selected value of 70 db relative to $2 \times 10^{-4}$ microbar rums pressure at the location of the sensor travelling with a velocity of 200 feet/sec a signal to noise ratio of 14 db is readily obtainable, if the signal and the flow noise are measured at a frequency of 1,000 cycles/sec in a 28 percent relative bandwidth.

In comparison, the signal to noise ratio obtained utilizing the same target signal in an identical noise environment when porous pipe sensors of identical size and configuration except for the absence of the internal reflective surface indicated at 15 in FIG. 1 has been measured as 6 – 8 db.

It will be appreciated that the acoustic sensor exemplarily depicted herein may be modified in accordance with standard aerodynamic practice as required in selected applications without departure from the purview of this disclosure.

I claim

1. An acoustic sensor for use in sensing the presence of an acoustic energy source in a moving fluid medium environment comprising an elongated porous pipe section of selected porosity, length and cross section configuration, said porous pipe section having a relatively thin side wall with a multitude of randomly distributed and substantially closely spaced, finite, nondescript channels determining a substantially constant flow resistance, $F_x$, in said fluid medium at relatively low level pressure differential thereacross; a pressure sensitive energy transition means having an electrical signal output proportional to a pressure wave input; means connecting said energy transition means to a first end of said elongated porous pipe section; a reflective conical surface internally disposed in said porous pipe section and extending substantially the length thereof with the base of said conical surface connected to the second end of said porous pipe section.

2. An acoustic sensor as defined in claim 1 wherein said porous pipe section is cylindrical and the taper of said conical reflective surface is parabolic.

3. An acoustic sensor as defined in claim 2 wherein said constant flow resistance, $F_x$, and the length L and diameter D of said cylindrical porous pipe section are in the relation $$F_x = \frac{4L}{D}(\rho c)$$

where $\rho$ is the density of the fluid medium and c is the velocity of sound in the medium.

4. An acoustic sensor as defined in claim 3 wherein said thin side wall is made of sintered stainless steel particles of selected micron size and said thin side wall has a substantially uniform porosity over substantially the entire surface area thereof.

5. An acoustic sensor as defined in claim 2 wherein a nose cone is connected to said second end of said porous pipe section, said nose cone adapted to minimize pressure wave turbulence along the outer surface of said porous pipe section in said moving fluid medium environment.

* * * * *